United States Patent [19]
Scott

[11] 3,778,653

[45] Dec. 11, 1973

[54] ALTERNATING CURRENT MACHINE ARMATURE

[76] Inventor: Harold C. Scott, 2114 Marvel, Irving, Tex. 75060

[22] Filed: Feb. 24, 1972

[21] Appl. No.: 228,896

[52] U.S. Cl. .............................. 310/144, 310/68 D
[51] Int. Cl. ........................................... H02k 13/02
[58] Field of Search .................. 310/144, 145, 146, 310/68, 68 D, 155, 158, 159, 161, 166; 322/90

[56] References Cited
UNITED STATES PATENTS

| | | | |
|---|---|---|---|
| 3,160,772 | 12/1964 | Miron | 322/90 |
| 3,267,353 | 8/1966 | Franklin | 322/90 |
| 3,034,035 | 5/1962 | Baumann | 310/68 D |
| 3,509,447 | 4/1970 | Wharton | 310/68 |
| 2,897,383 | 7/1959 | Barrows | 310/68 D |

FOREIGN PATENTS OR APPLICATIONS

| | | | |
|---|---|---|---|
| 618,557 | 2/1949 | Great Britain | 322/90 |

*Primary Examiner*—R. Skudy
*Attorney*—Kenneth R. Glaser et al.

[57] ABSTRACT

Disclosed is an improved armature construction for an alternating current generator wherein a plurality of separate sets of armature windings disposed within a magnetic flux field have their respective outputs coupled to respective output terminals which are coupled by unidirectional current means to produce a plurality of output currents which are defined multiples of one another.

6 Claims, 4 Drawing Figures

ALTERNATING CURRENT MACHINE ARMATURE

This invention pertains to dynamoelectric apparatus, more particularly to generators, and even more particularly to improved armature constructions of alternating current generators.

Dynamoelectric apparatus employed as a generator broadly includes a rotor and stator and field and armature windings respectively associated therewith, current flow through the field windings establishing a magnetic flux field which is either moved with respect to the armature windings or the armature windings are moved with respect to the field to generate electric energy. Depending upon the particular application, the armature or the field windings may respectively be placed either on the rotating part (rotor) or the fixed part (stator) of the apparatus. Output current is then derived from the armature windings and either rectified for d-c applications or used in the a-c form.

There are many applications that require that the output current from a generator be controllable or selectable over a wide range of values. For example, an arc welder requires that the generated voltage be substantially higher for striking the arc than during the welding operation itself. Many techniques have been attempted to achieve this current flexibility, particularly in welding apparatus, including providing an external variable reistance or inductive reactance in series with the arc, as well as directly controlling the amount of field excitation, thereby to control the output current from the armature winding. While these techniques have generally served the purpose, they have not been entirely successful under all conditions of service in achieving the desired flexibility of current control. In particular, with respect to arc welding apparatus and the use of field excitation control, the lowest achievable value of output current is limited by the lowest acceptable open circuit voltage for striking the arc, and cannot ordinarily be less than one-half the required maximum output current.

It is therefore a principal object of the invention to provide a new and improved construction of generator apparatus.

It is another object of the invention to provide improved generator apparatus which is capable of producing wider ranges of output current than heretofore obtainable.

It is a further object of the invention to provide a unique armature winding construction of an alternating current generator.

It is a still further object of the invention to provide a new and improved technique for output current control of a single or multi-phase alternating current generator particularly applicable for welding apparatus.

In accordance with these and other objects, the present invention is directed to the provision of a plurality of sets of armature windings disposed within the established magnetic flux field of an alternating current generator, each set of armature windings wound for full voltage and proportionately sharing the magnetic flux field. Each set of armature windings has its repective rectified output coupled to separate output terminals which are themselves coupled by unidirectional current means, thereby to produce a plurality of output currents which are defined multiples of one another. A preferred embodiment of the invention employs two such sets of three-phase armature windings, each set effectively disposed around one-half the circumference of the generator stator (and thus sharing approximately by one-half the magnetic flux field produced by the rotor field windings), each set of armature windings having a number of turns sufficient to produce approximately one-half the current that would be produced by a single set of three-phase armature windings disposed around the entire circumference of the stator. The output current of one of the ouput terminals therefore is approximately one-half the output current at the other output terminals.

Additional features of the invention, as well as further objects and advantages thereof, will become more readily understood by reference to the following detailed description taken in conjunction with the drawings, in which.

Figure 1:
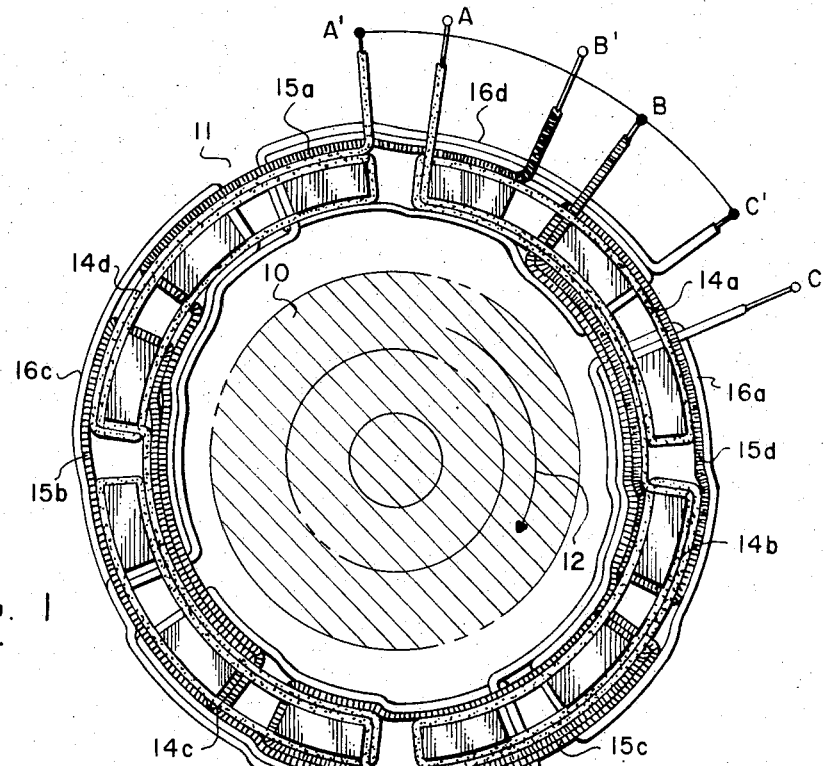
FIG. 1 is a pictorial representation of the rotor and stator of an alternating current generator illustrating a set of armature windings disposed upon the stator in a conventional manner.
Figure 3:
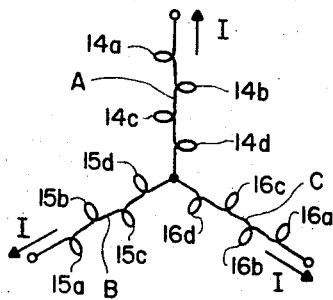
FIG. 3 is a schematic diagram of the set of armature windings represented in FIG. 1.

Referring now to FIG. 1, the essential portions of a generator are illustrated as including a rotor 10 positioned and adapted tò rotate in the direction of the arrow 12, for example, within the confines of a cylindrical slotted stator 11. The rotor 10 is of conventional construction and includes field windings (not shown) which, in combination with a conventional d-c supply, establishes a magnetic flux of field rotatable with respect to the armature windings disposed upon the stator 11. The set of armature windings illustrated in FIGS. 1 and 3 is conventional and, for illustrative purposes, comprises a three-phase Y arrangement, each phase comprising four windings (four poles), each winding having one turn. Thus, for example, phase A comprises four windings 14a–14d; phase B comprises windings 15a–15d; and phase C comprises windings 16a–16d. For any one particular value of field excitation, a current I of specified value will then be generated in each phase, as shown in FIG. 3.

It is to be understood that the stator armature winding arrangement illustrated in FIGS. 1 and 3 conventional, and constitutes the arrangement upon which the now described improvement is based. It is to be further understood that the reference to the term "set" of armature windings contemplates that each set may include either a single phase or multiphase windings (as is illustrated).

Figure 2:
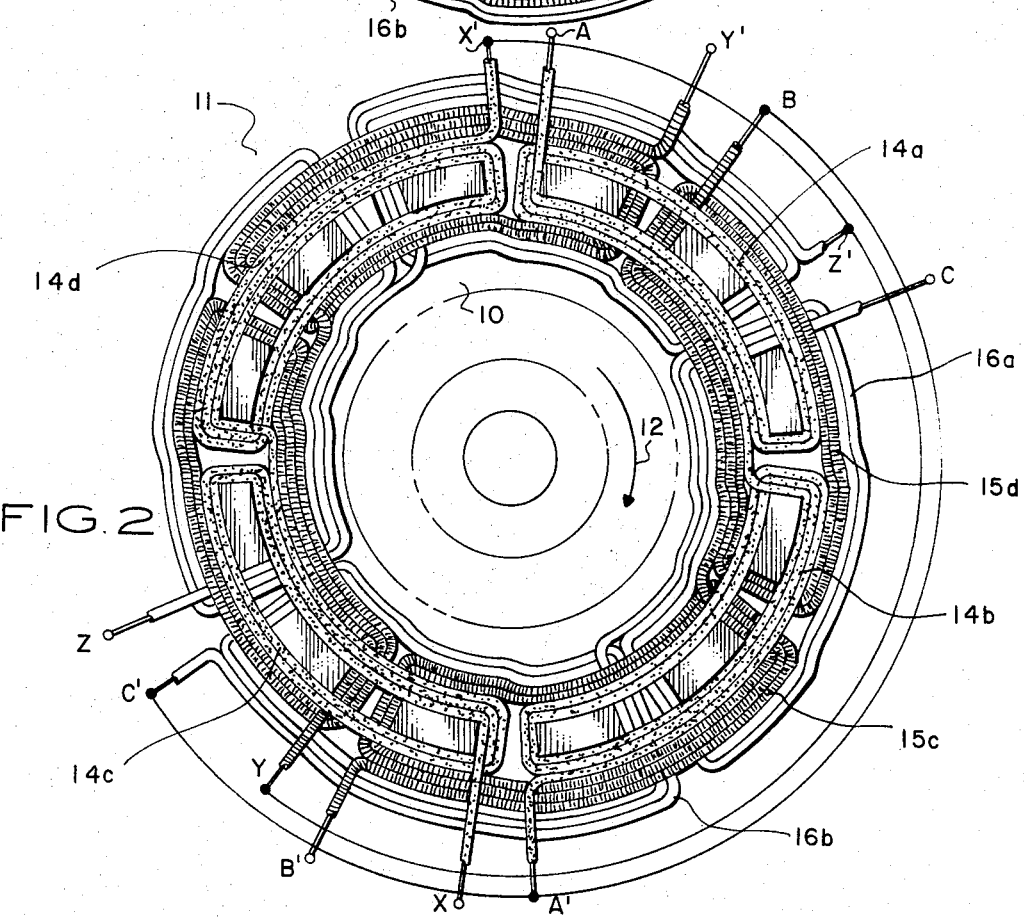
FIG. 2 is a pictorial representation of the rotor and stator arrangement of FIG. 1 illustrating a plurality of sets of armature windings disposed upon the stator in accordance with the present invention.
Figure 4:
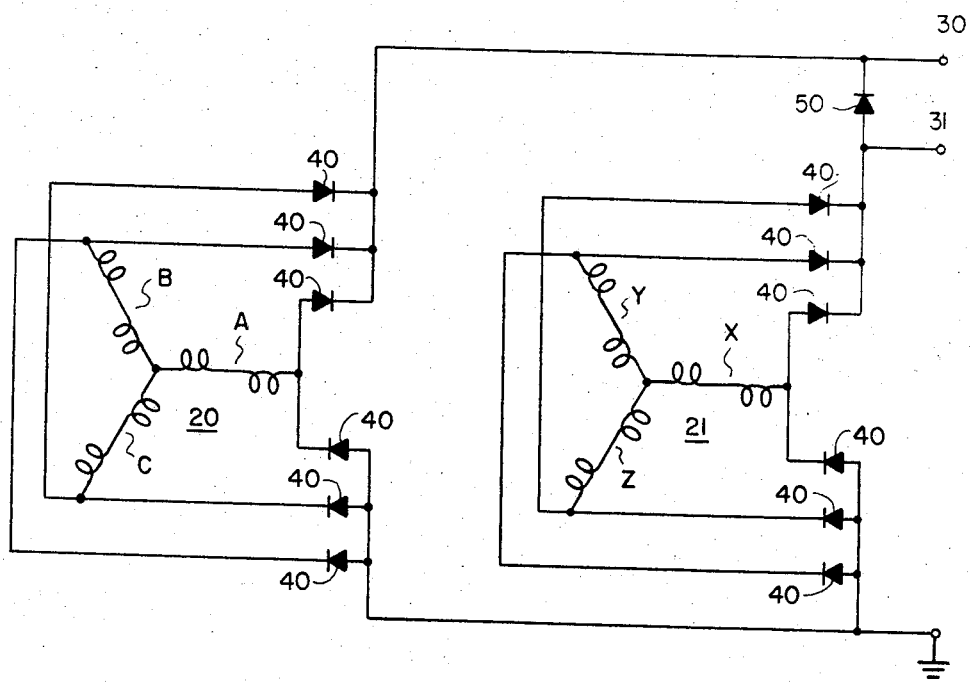
FIG. 4 is a schematic diagram of the armature windings, and their interconnection, represented in FIG. 2.

Accordingly, and with reference now to FIGS. 2 and 4, the armature windings of FIG. 1 are modified to produce the resulting armature winding arrangement and interconnection scheme of the present invention. In accordance with this preferred embodiment, there is provided on the same stator 11 two sets of three-phase windings, each set wound for full voltage but only on one-half of the circumference of the stator 11. Additionally, each of the windings of each set comprises twice the number of turns as that illustrated in FIG. 1. Thus, the armature winding arrangement of FIG. 2 comprises two sets of three-phase windings (A, B and C and X, Y, and Z), each phase comprising two pole windings (14a, 14b; 14c, 14d; 15a, 15b; etc.) of two turns each. These two sets of three-phase, Y connected armature windings are designated generally as 20 and 21 in the schematic representation of FIG. 4.

In accordance with a specific feature of the present invention, the rectified output (by way of conventional diodes 40) from the sets 20 and 21 of the armature windings are respectively coupled through a pair of output terminals 30 and 31. These output terminals 30 and 31 (and consequently the output currents from armature winding sets 20 and 31) are coupled together by unidirectional current means 50 (in the manner illustrated in FIG. 4) which may, for example, be provided by a conventional power diode. The diode 50 is effective to prevent output current from armature winding set 20 from reaching terminal 31 (low output terminal) while at the same time enabling the current output from armature winding set 21 to be combined with the current output from armature network 20 at the output terminal 30 (high output terminal). Thus, assuming substantially identical characteristics of the sets 20 and 21, the current output at terminal 31 is essentially equal to one-half the current output at terminal 30.

Furthermore, since the current within each of the armature sets 20 or 21 has twice the demagnetizing effect on the field flux as that of the armature winding set illustrated in FIGS. 1 and 3 (since it has the same number of conductors on half the stator as the conventional arrangement of FIGS. 1 and 3 would have on the full stator), the ouput current at terminal 31 is essentially one-half of that of the output current I from the network arrangement of FIGS. 1 and 3, and the output current at terminal 30 is essentially equal to that I, 1, for the same value of rotor excitation. Thus, by varying the rotor excitation in the manner conventionally known, the output current at terminal 31 can vary from 0 to one-half the maximum output at terminal 30, and the current range at output terminal 30 can range from one-half to full output of the output current from the armature winding set of FIG. 1.

It can thus be observed that the novel and inventive armature winding arrangement illustrated in FIGS. 2 and 4 offers a high degree of flexibility in output current production and control. For example, while the preferred embodiment of the invention has been described as producing two sets of output currents, one set having approximately twice the value of the other, any number of output currents and multiples thereof may be provided. Thus, by dividing the armature winding of FIG. 1 into three sets of armature windings, tripling the number of turns of each winding, and respectively coupling the three sets of windings to three output terminals which are respectively coupled by unidirectional current means, it would be possible to produce output currents essentially equal to one-third, two two-thirds, and the same as that of the output current I of the conventional arrangement.

Furthermore, while the preferred embodiment of the invention has been described with reference to a multiphase, Y connected armature winding, the principles of the present invention are equally applicable to any phase winding which may be connected in a conventional delta or other configuration.

Various other modifications of the disclosed embodiment as well as additional embodiments may become apparent to those skilled in the art after reviewing the foregoing description without departing from the spirit and scope of the invention as defined by the following claims.

What is claimed is:
1. An alternating current generator, comprising:
  a. means for establishing a rotating magnetic flux field,
  b. armature means disposed within said rotating magnetic flux field, said armature means comprising at least two separate sets of armature windings,
  c. means coupling the respective outputs from said at least two separate sets of armature windings to respective output terminals, and
  d. unidirectional current means disposed between each of said repective output terminals, whereby the current output at one of said output terminals is essentially equal to the current within one of said armature winding sets and the current output at the other of said output terminals is essentially equal to the sum of the currents within at least two of said separate sets.
2. The apparatus as defined by claim 1 further including rotor means and stator means, and wherein said at least two separate sets of armature windings are disposed upon said stator.
3. The generator as defined by claim 2 wherein the output from said at least two separate sets of armature windings are rectified.
4. The apparatus as defined by claim 3 wherein said unidirectional current means is a power diode.
5. In an alternating current generator of the type comprising means for establishing a rotating magnetic flux field and an armature winding having n turns disposed within said flux field for generating an output current of one defined value, a method for obtaining a plurality Y of output currents from said generator, each of said plurality of output currents respectively having a value substantially equal to a/Y of the said one defined value, where a is a series of integers not greater than Y, said method comprising:
  a. replacing said armature winding with a plurality Y of separate armature windings disposed within said magnetic flux field, each of said separate armature windings having Yn turns,
  b. coupling said separate armature windings to respective Y output terminals, and
  c. providing unidirectional current means between respective ones of said output terminals, thereby to provide for the production of 1/Y, 2/Y . . . n/Y times said one defined value of output current at said Y output terminals.
6. An alternating current generator, comprising:
  a. rotor means having field winding disposed thereupon for establishing a rotating magnetic flux field,
  b. stator means,
  c. armature winding means disposed upon said stator means, said armature winding means comprising two separate sets of armature windings, each of said sets coupled through rectifying means to an output terminal, and
  d. unidirectional current means disposed between each of said output terminals.

* * * * *

UNITED STATES PATENT OFFICE
CERTIFICATE OF CORRECTION

Patent No. 3,778,653           Dated December 11, 1973

Inventor(s) Harold C. Scott

It is certified that error appears in the above-identified patent and that said Letters Patent are hereby corrected as shown below:

In the title, change "Machine Armature" to --Generator--.

Col. 1, line 28, between "variable" and "or", change "reistance" to --resistance--.

Col. 2, line 49, between "3" and "conventional" insert --is--.

Col. 3, line 12, delete "31" and insert --21--.

Col. 3, line 35, between "that" and "1" delete "I" and insert --of--.

Signed and sealed this 9th day of April 1974.

(SEAL)
Attest:

EDWARD M. FLETCHER, JR.        C. MARSHALL DANN
Attesting Officer               Commissioner of Patents